(12) United States Patent
Stojanovski

(10) Patent No.: US 6,406,225 B1
(45) Date of Patent: Jun. 18, 2002

(54) BORING HEAD ASSEMBLY

(76) Inventor: Stojan Stojanovski, 1950 Birchwood, Troy, MI (US) 48084

( * ) Notice: Subject to any disclaimer, the term of this patent is extended or adjusted under 35 U.S.C. 154(b) by 0 days.

(21) Appl. No.: 09/561,893

(22) Filed: May 1, 2000

(51) Int. Cl.⁷ .............................................. B23B 29/034
(52) U.S. Cl. ...................... 408/183; 408/153; 408/185
(58) Field of Search ................................ 408/153, 181, 408/182, 183, 185

(56) References Cited

U.S. PATENT DOCUMENTS

| | | | | |
|---|---|---|---|---|
| 3,767,317 A | * | 10/1973 | Ortlieb | 408/183 |
| 4,006,995 A | * | 2/1977 | Gruner | 408/183 |
| 4,135,846 A | * | 1/1979 | Nowakowski | 408/183 |
| 4,278,372 A | * | 7/1981 | Heisner | 408/183 |

FOREIGN PATENT DOCUMENTS

| | | | | |
|---|---|---|---|---|
| FR | 1278739 A | * | 11/1961 | 408/183 |
| GB | 606699 A | * | 4/1948 | 408/183 |

* cited by examiner

*Primary Examiner*—Daniel W. Howell
(74) *Attorney, Agent, or Firm*—Charles W. Chandler

(57) ABSTRACT

A dual cutting insert boring tool having means for adjusting the distance between the two inserts in order to adjust the diameter of their cutting path.

7 Claims, 4 Drawing Sheets

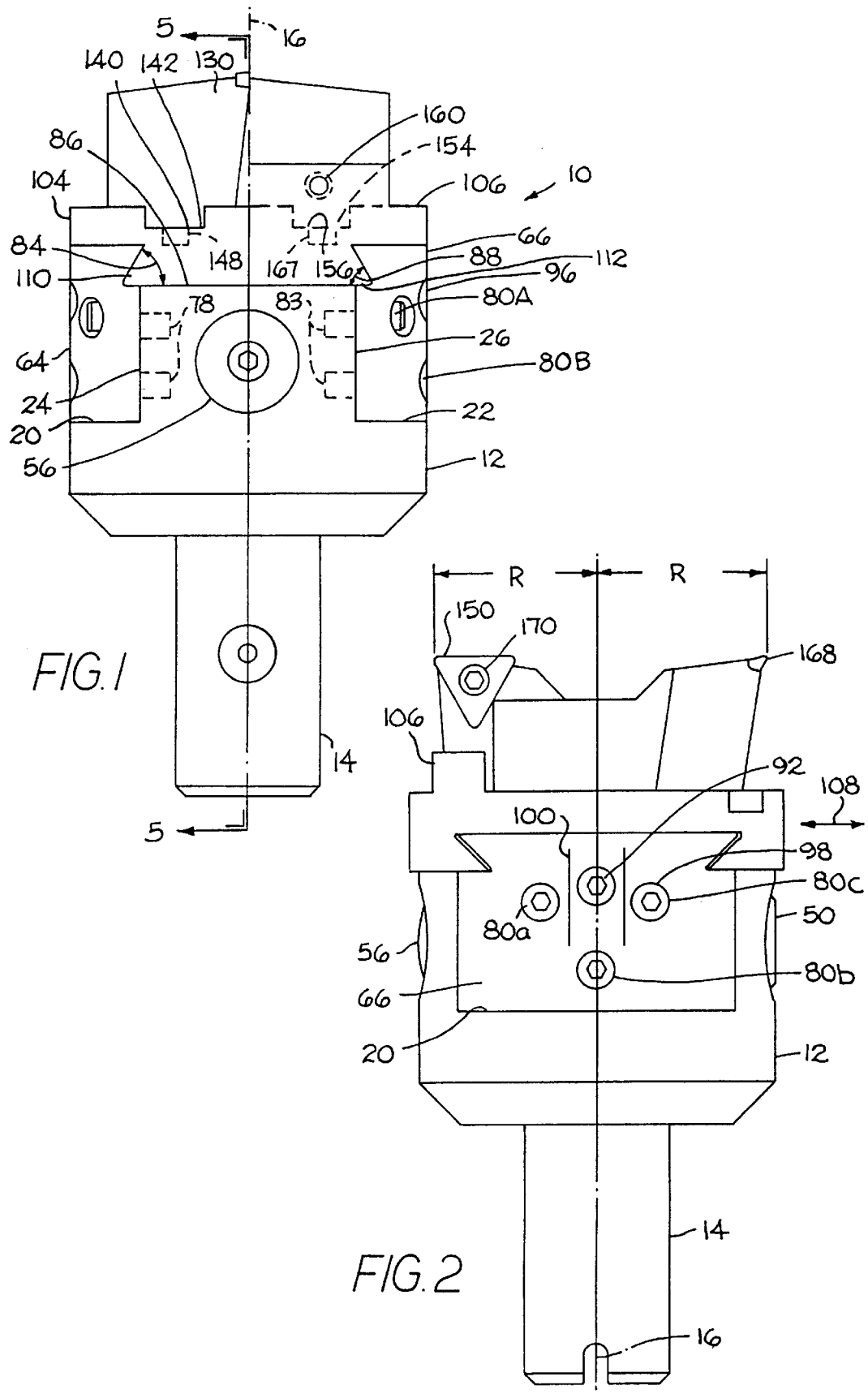

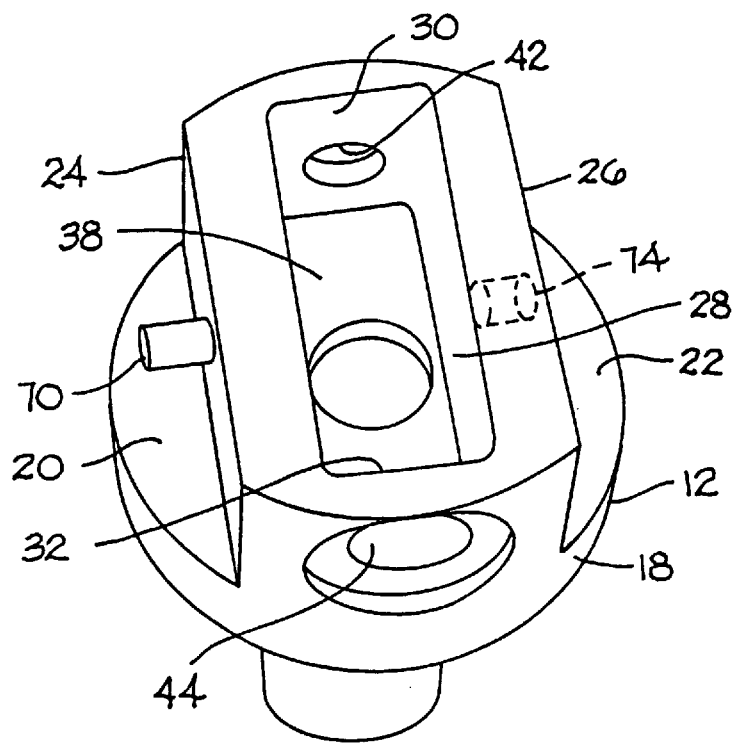
FIG. 6
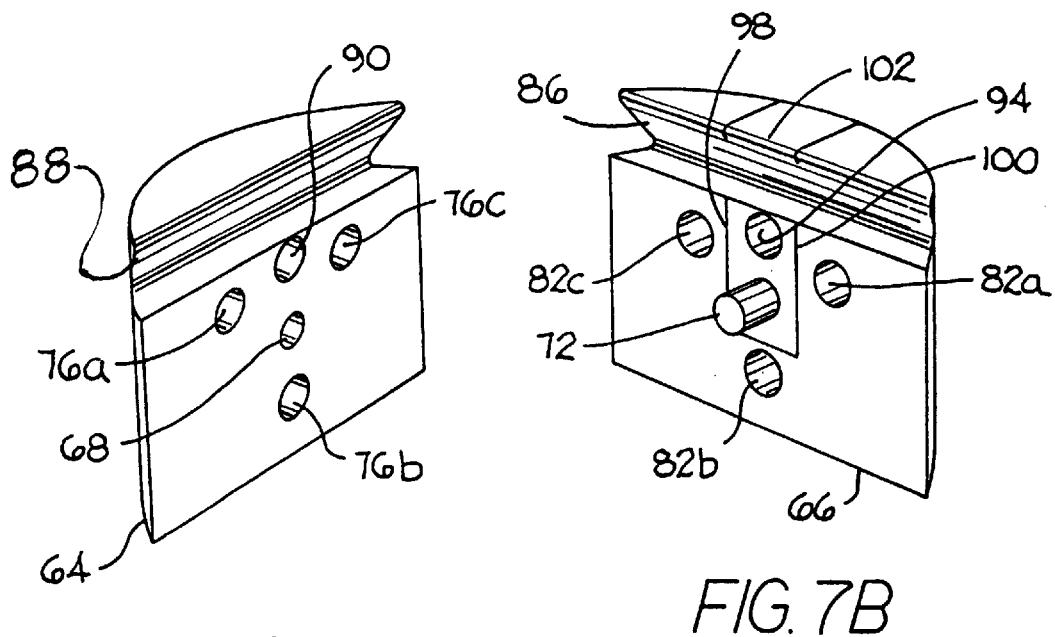
FIG. 7A
FIG. 7B

BORING HEAD ASSEMBLY

BACKGROUND AND SUMMARY OF THE INVENTION

Multiple insert cutting tools are commonly used for forming a relatively large bore in a metal workpiece. Typically, a series of cutting inserts, each mounted on a cartridge, are employed to successively rough, semi-finish, and finish the bore by replacing the cutting inserts. The inserts must be precisely located with respect to the axis of rotation of the boring tool. It is also desirable to provide means for quickly changing a cartridge to replace the insert.

The broad purpose of the present invention is to provide an improved boring tool having a pair of replaceable cutting tool inserts mounted on opposite sides of the tool body. In the preferred embodiment of the invention, an adjusting screw is mounted on the tool body along an axis that is perpendicular to the rotary axis of the tool. A pair of cartridge carriers are slidably mounted on the tool body and connected to the adjusting screw.

The adjusting screw has a right-hand thread connected to one of the cartridge carriers, and a left-hand thread connected to the other cartridge carrier. The relationship is such that by rotating the adjusting screw, the two cartridge carriers move either toward or away from the rotating axis of the cutting tool. By precisely adjusting the adjusting screw, the cutting tool inserts can be precisely moved to their cutting positions. Novel structure for fastening the cartridge carriers to the tool body, and the two supporting cartridges to the cartridge carrier are also disclosed.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which:

FIG. 1 is an elevational view of a boring tool illustrating the preferred embodiment of the invention;

FIG. 2 is a view as seen from the right side of FIG. 1;

FIG. 6 is a perspective view of the body with the other components removed for descriptive purposes;

FIGS. 7A and 7B are views of the two side plates; and

DESCRIPTION OF THE PREFERRED EMBODIMENT

Figure 3:
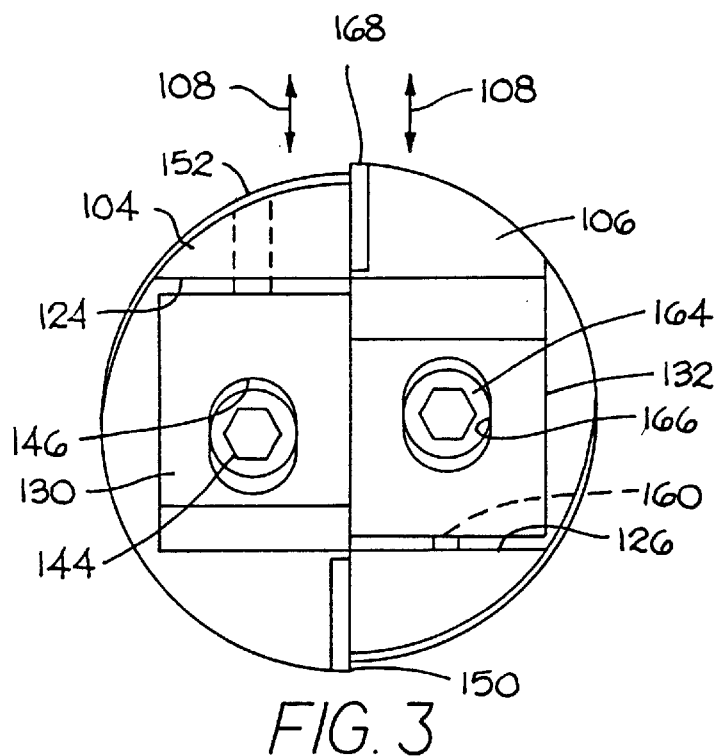
FIG. 3 is a plan view of the tool of FIG. 1.

Referring to the drawings, FIG. 1 illustrates a preferred boring tool 10, which includes a metal body 12 having a shank 14. Shank 14 is adapted to be mounted in a suitable rotating driving means for rotating tool 10 about a longitudinal rotating axis 16.

Figure 5:
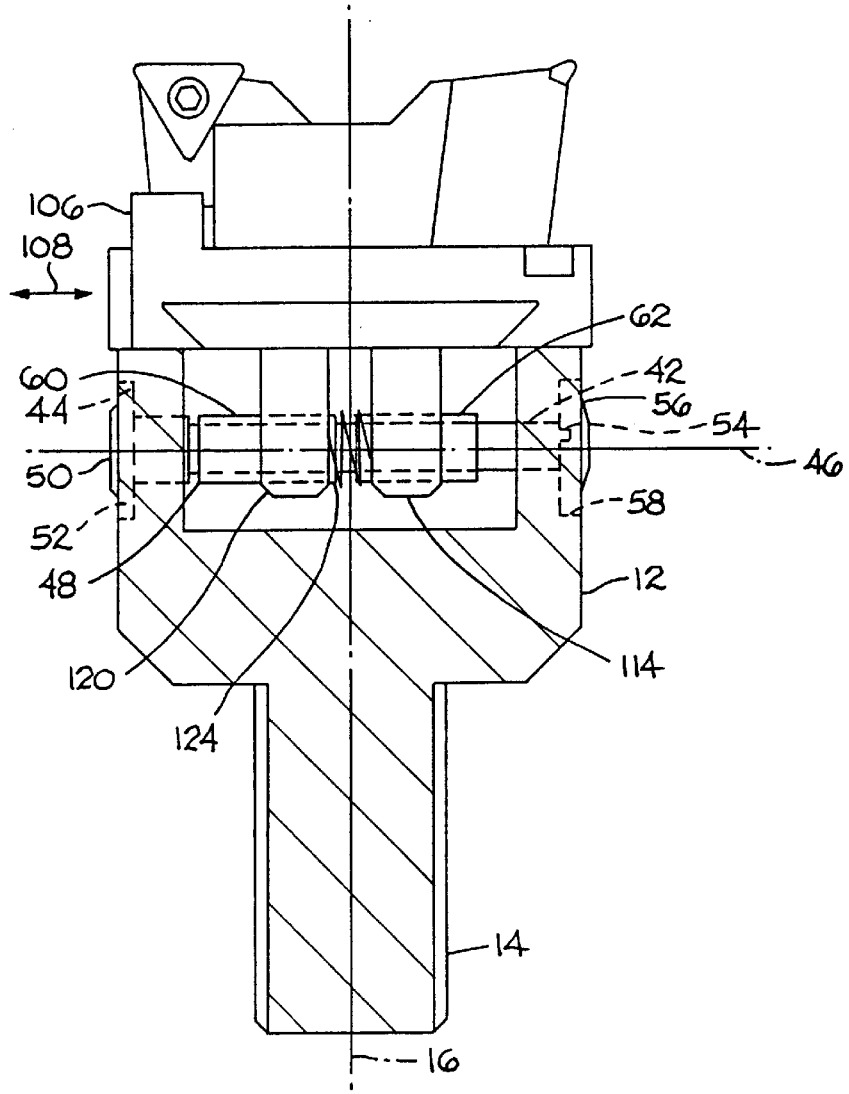
FIG. 5 is a partially sectional view as seen along lines 5—5 of FIG. 1.

Referring to FIGS. 5 and 6, body 12 has an annular lower portion 18, adjacent shank 14, and an upper reduced section forming a pair of side plate seats 20 and 22. As can be seen in FIG. 1, seats 20 and 22 lie in a common plane transverse to axis 16.

The body also has a pair of outer parallel side surfaces 24 and 26 which extend at right angles and upwardly from seats 20 and 22, respectively, as illustrated in FIG. 6. Side surfaces 24 and 26 are disposed equal distances on opposite sides of rotating axis 16.

The body also has a box-shaped cavity 28 which includes a pair of internal parallel end walls 30 and 32, on opposite sides of axis 16. As best illustrated FIGS. 4 and 6, cavity 28 also has a pair of internal parallel sidewalls 34 and 36. The cavity has a planar bottom surface 38, which is at right angles to end walls 30 and 32, and sidewalls 32 and 34. The two sidewalls and the bottom wall form a somewhat rectangular cross section for the cavity, having a depth slightly greater than its width.

End wall 30 has an adjusting screw bore 42 aligned with a slightly larger adjusting screw bore 44 in end wall 32. Bores 42 and 44 are aligned along adjusting screw axis 46, which is at right angles to and intersects rotating axis 16, as best shown in FIG. 4.

Figure 4:
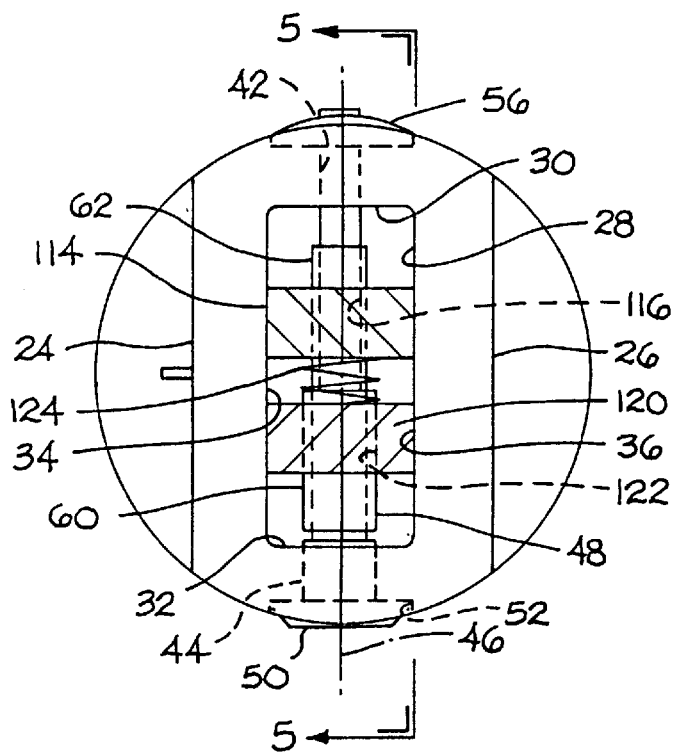
FIG. 4 is a partially sectional view with the cartridge carrier removed.
Figure 8:
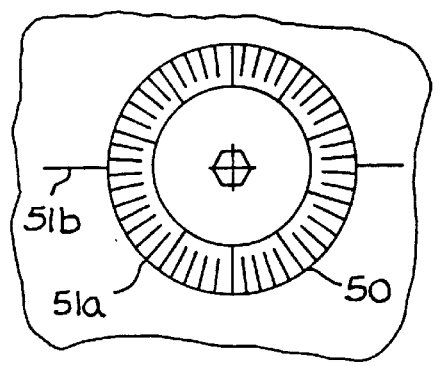
FIG. 8 illustrates the dial indicator on the adjusting screw.

Still referring to FIGS. 4 and 8, an elongated adjusting screw 48 has one end journalled in bore 42 and its opposite end journalled in bore 44, spanning the opposed ends of cavity 28. An indicator dial 50 is integrally attached to one end of the adjusting screw and seated in an annular recess 52. Dial 50 has indicia 51a, which is aligned with 51b on the body to indicate the radial position of the cutting inserts. The opposite end of the adjusting screw has a small integral pin 54. A washer 56 having a complementary opening is snapped on the pin and the end of the adjusting screw and is seated in a circular recess 58. The adjusting screw is rotatable about axis 46.

Referring to FIG. 5, the adjusting screw has an enlarged right-hand threaded section 60 and a smaller diameter left-hand threaded section 62 supported on opposite sides of axis 16. This arrangement permits the adjusting screw to be inserted through bore 44 into cavity 28.

Side plates 64 and 66, illustrated in FIGS. 7A and 7b, are mounted on side plate seats 20 and 22, as illustrated in FIG. 1. Side plate 64 has a pin-receiving opening 68, which receives a locating pin 70 extending from side surface 24. Side plate 66 has a locating pin 72, which is received in a locating hole 74 in side surface 26.

Referring to FIG. 2, three socket head cap screws 74a, 74b, and 74c are received through openings 76a, 76b, 76c, respectively, in side plate 64 and threadably received into three tapped openings 78 (only two shown) in side surface 24.

Side plate 66 is similarly fastened to the body by three socket head cap screws 80a, 80b and 80c which are received in openings 82a, 82b, and 82c, and threadably received in tapped openings 83 (only two shown) in the body 12, as illustrated-in FIGS. 1 and 7B.

Referring to FIGS. 1 and 7A, the upper edge of side plate 64 has a 60° slot. The slot has a horizontal leg aligned with the top surface 84 of the body.

Similarly, side plate 66 has a 60° slot at 86. The slot has a horizontal surface aligned with top surface 84.

Side plate 64 has a fastener-receiving opening 90 for receiving a cap screw 92 in a threaded opening, not shown, in the body, for a purpose that will presently be described. Similarly, side plate 66 has an opening 94 for receiving a cap screw 93 for a purpose that will be described. Side plate 66 has a pair of parallel slits 98 and 100 on opposite sides of opening 94.

Slits 98 and 100 are perpendicular to slot 86 and extend down on opposite sides of locating pin 72 to define a locking section 102.

Referring to FIG. 1, a pair of similarly-shaped cartridge carriers 104 and 106 are slidably mounted on top surface 86, each along a path of motion that is parallel to the axis of the adjusting screw in the direction of arrow 108, illustrated in FIG. 2. Cartridge carrier 104 has a 60° lip 110 that is slidably received in slot 84. Similarly, cartridge carrier 106 has a 60° lip 112 that is slidably received in slot 88.

Referring to FIG. 4, cartridge carrier 104 has an integral block-like guide 114 received in cavity 28, the guide sides slidably engaging sidewalls 34 and 36. Guide 114 has an internally threaded bore 116 that threadably receives threaded section 62 on the adjusting screw.

Similarly, cartridge carrier 106 has an integral block-like guide section 120 received in cavity 28. The sides of the guide are closely slidably engaged with sidewalls 34 and 36 of the cavity. Guide 120 has an internally threaded bore 122, which is threadably engaged with threaded section 60 of the adjusting screw. The arrangement is such that as the adjusting screw is rotated in one direction, the two guides move away from one another and as the adjusting screw is rotated in the opposite direction, the two guides move toward one another.

A spring 124 is mounted around the mid-section of the adjusting screw and biases guides 114 and 120 away from one another to reduce any looseness between the threaded components.

Referring to FIG. 3, cartridge carrier 104 has a shoulder 124, and cartridge carrier 106 has a similar shoulder 126. The two shoulders are disposed in parallel planes on opposite sides of axis 16. A pair of cutting tip cartridges 130 and 132 is mounted on cartridge carriers 104 and 106, respectively.

Referring to FIG. 1, cartridge carrier 104 has a slot 140 that is parallel to the axis of the adjusting screw. The lower surface of cartridge 130 has a ridge 142 slidably received in slot 140 so that the cartridge slidably moves along a path of motion parallel to the axis of the adjusting screw.

Referring to FIG. 3, a socket head cap screw 144 is received in elongated opening 146 and engages a tapped opening 148, in the cartridge carrier shown in FIG. 1, for securely fastening the cartridge in position when the position of the cutting tip insert 150 has been established. The radial position of cutting tip 150 is finely adjusted by an adjusting screw 152, and then cap screw 144 tightly secures the replaceable cartridge in position.

The primary adjusting screw moves the two cartridge carriers together in opposite directions, whereas the fine adjustment screws 152 and 160 provide means for individually adjusting the two cartridges.

Similarly, a second replaceable cartridge 132 has a ridge 154 slidably received in a slot 156 in the cartridge carrier. Slot 156 is parallel to slot 140 and parallel to the rotating axis of the adjusting screw. An adjusting screw 160, mounted on shoulder 126, provides means for finely adjusting the position of the cartridge in a direction parallel to the axis of adjusting screw 48. A cap screw 164 is received in an elongated opening 166, and engaged in a tapped opening 167, best illustrated in FIG. 1, to provide means for precisely locating the position of a cutting tip insert 168.

As best illustrated in FIG. 2, the two cutting tip inserts are identical in configuration and seated on the top of their respective cartridges. The cutting tip inserts are fastened in position by socket head set screws 170 (only one shown). Note that the cutting corner of each of the inserts extends beyond its respective cartridge.

The radial distance "R" of each of the cutting tips is identical with respect to the axis of rotation 16. This distance is adjusted by rotating adjusting screw 48 which in turn moves the cutting tips in opposite directions, either toward or away from one another, to reduce or to increase the value of "R" and thereby the diameter of the bore being cut in the workpiece. When the cutting tips have been precisely located by adjusting screws 152 and 160, and the primary adjusting screw 48, the cartridge carriers are locked in position by the fastener 92. Fastener 93 flexes locking section 102 sufficiently to cause the cartridge carrier to be clamped between the cavity sidewall and slot 88. Similarly, the other cartridge carrier is locked by the locking screw 92, which clamps cartridge carrier 104 between slot 84, and the opposite wall of cavity 28.

The preferred tool provides means for very precisely adjusting the radial distance of the two cutting tips. Further, it provides means for quickly changing a cartridge and its cutting tips for different boring operations, such as rough finish or final finish.

Having described my invention, I claim:

1. An adjustable dual cutting insert boring tool for forming a hole in a metal workpiece, comprising:

a tool body having a shank adapted to be coupled to a rotary drive means, the tool body having a longitudinal rotating axis;

a first cutting tool insert and a second cutting tool insert;

means for supporting said first cutting tool insert and said second cutting tool insert at equal radial distances from said rotating axis for rotation in an annular path of motion defining the diameter of a hole being cut in a workpiece:

an elongated adjusting screw, and means for mounting the adjusting screw on the body for rotation about an adjusting screw axis disposed at right angles to and intersecting said tool body rotating axis, the adjusting screw having a right-hand threaded section and a left-hand threaded section, both of said threaded sections being disposed along the adjusting screw axis;

a first cartridge tool carrier having a bore with an internal left-hand thread threadably receiving the left-hand threaded section on the adjusting screw;

a second cartridge tool carrier having a bore with an internal right-hand thread threadably receiving the right-hand threaded section on the adjusting screw such that the first and the second cartridge tool carriers are moved in an outward radial direction away from said rotating axis as the adjusting screw is rotated in a first direction and moved in an inward radial direction as the adjusting screw is rotated in the opposite direction;

first means mounted on the first cartridge tool carrier and supporting the first cutting tool insert such that the first cutting tool insert moves in a radial direction with the first cartridge tool carrier;

second means mounted on the second cartridge tool carrier and supporting the second cutting tool insert such that the second cutting tool insert moves in a radial direction with the second cartridge tool carrier;

the tool body having an elongated cavity having end walls enclosing said rotating axis, and bore means on said end walls for supporting the ends of the adjusting screw such that the right-hand and left-hand threaded sections are disposed between said end walls;

the cavity having a pair of opposed parallel sidewalls, and at least one of the cartridge tool carriers having an inner guide disposed between the sidewalls of the elongated cavity, moveable along a path of motion parallel to the adjusting screw axis, and including a side plate having a complementary lip mounted on the body to engage said at least one of the cartridge tool carriers; first fastener means for fastening the side plate to the body, and second fastener means for clamping said at least one of the cartridge tool carriers in an adjusted position with respect to the body;

whereby the two cutting tool inserts move in a common annular cutting path as the tool body is rotated in a power motion.

2. A boring tool as defined in claim 1, in which at least one of the side plates has a pair of spaced parallel slits defining a locking section that is relatively moveable with respect to the remainder of the slide plate for clamping a cartridge carrier in an adjusted position.

3. A boring tool as defined in claim 1, including a second side plate mounted on the body on the opposite side thereof as the first mentioned side plate.

4. An adjustable dual cutting insert boring tool for forming a hole in a metal workpiece, comprising:

a tool body having a shank adapted to be coupled to a rotary drive means, the tool body having a longitudinal rotating axis;

a first cutting tool insert, and a second cutting tool insert;

an elongated adjusting screw, and means for mounting the adjusting screw on the body for rotation about an adjusting screw axis disposed at right angles to and intersecting said tool body rotating axis, the adjusting screw having a right-hand threaded section and a left-hand threaded section, both of said threaded sections being disposed along the adjusting screw axis;

a first cartridge tool carrier having a bore with an internal left-hand thread threadably receiving the left-hand threaded section on the adjusting screw;

a second cartridge tool carrier having a bore with an internal right-hand thread threadably receiving the right-hand threaded section on the adjusting screw such that the first and the second cartridge tool carriers are moved in an outward radial direction away from said rotating axis as the adjusting screw is rotated in a first direction and moved in an inward radial direction as the adjusting screw is rotated in the opposite direction;

first means mounted on the first cartridge tool carrier and engaging the first cutting tool insert such that the first cutting tool insert is adjustably movable in a radial direction with the first cartridge tool carrier independent of an adjustment of the second cutting tool insert in a radial direction; and second means mounted on the second cartridge tool carrier and adjustably movably engaging the second cutting tool insert in a radial direction with the second cartridge tool carrier to an equal radial distance from said rotating axis as said first cutting tool insert;

whereby the two cutting tool inserts move in a common annular cutting path as the tool body is rotated in a power motion.

5. An adjustable dual cutting insert boring tool as defined in claim 4, in which the first means includes a second adjusting screw engageable with the first cartridge tool carrier, and the second means includes a third adjusting screw engageable with the second tool cartridge carrier, the second and the third adjusting screws being axially moveable about respective axes that are parallel to said adjusting screw axis.

6. A boring tool as defined in claim 4, in which the first and the second cutting tool inserts are mounted on opposite sides of the tool body.

7. An adjustable dual cutting insert boring tool as defined in claim 5, and in which each of the cartridge tool carriers are individually removable from the tool body without removing any of said adjusting screws from the tool body.

\* \* \* \* \*